United States Patent Office 3,780,051
Patented Dec. 18, 1973

3,780,051
CERTAIN 2-(THIAZOL-2-YL)-3,5-DIOXO-4-METHYL-1,2,4-THIADIAZOLIDINES
Arnold D. Litt, North Plainfield, and John E. Englehart, Westfield, N.J., assignors to Esso Research and Engineering Company
No Drawing. Original application May 25, 1970, Ser. No. 40,368, now Patent No. 3,096,101. Divided and this application June 9, 1972, Ser. No. 261,458
Int. Cl. C07d 99/02
U.S. Cl. 260—306.8 F          5 Claims

ABSTRACT OF THE DISCLOSURE

Compounds being selected from the group represented by the following structural formulae:

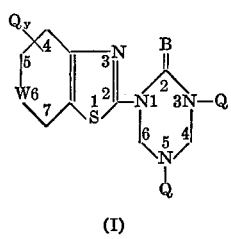

(I)

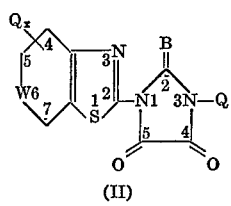

(II)

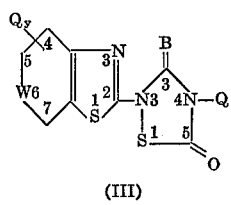

(III)

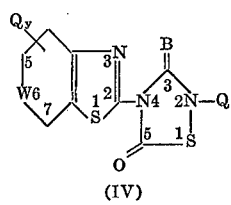

(IV)

where W can be $CHR_3$, O, or $S(O)_n$ and where $n$ can be 0, 1 or 2, or N—$R_4$. $R_3$ can be hydrogen or $C_1$–$C_6$ alkyl and $R_4$ can be $R_3$, nitro, amino, or O. Q at different positions can be different and is selected from the group consisting of hydrogen, $C_1$ to $C_{10}$ alkyl, $C_3$ to $C_{10}$ alkenyl, $C_4$ to $C_{10}$ alkynyl, $C_3$ to $C_8$ cycloalkyl, $C_1$ to $C_7$ alkoxy, $C_3$ to $C_{10}$ cycloalkoxy, $C_1$ to $C_{10}$ alkylthio, $C_1$ to $C_{10}$ alkylamino, $C_2$ to $C_{20}$ dialkylamino, $C_3$ to $C_{10}$ cycloalkylamino, $C_2$ to $C_{20}$ dicycloalkylamino. Each of the above mentioned hydrocarbon groups may be optionally substituted by halogen, hydroxy, $C_1$ to $C_4$ alkoxy, sulphonamido, $C_1$ to $C_4$ alkylthio, nitro, cyano, thiocyano or perhaloalkyl; $C_6$ or $C_{10}$ aryl, $C_6$ or $C_{10}$ aryloxy, $C_6$ or $C_{10}$ arylthio where the aforementioned groups may be optionally substituted by $C_1$ to $C_4$ alkyl, $C_1$ to $C_4$ alkoxy, $C_1$ to $C_4$ alkylthio, halogen, hydroxy, nitro, cyano, or carboalkoxy. Q may also be cyano, sulphonamido, $C_1$ to $C_6$ carboalkoxy, perfluoroalkyl, nitro, mercapto, $C_4$ to $C_9$ heteroaryl or $C_1$ to $C_{10}$ acyloxy optionally substituted by $C_1$ to $C_4$ alkyl, $C_1$ to $C_4$ alkoxy, $C_1$ to $C_4$ alkylthio, halogen, nitro, cyano, carboalkoxy, thiocyano or perhaloalkyl. When Q is $C_1$ to $C_{10}$ alkyl, $y$ may take values from 0 to 6. $y$ may take values from 0 to 4 for all other definitions of Q. B may be O or S.

---

This is a division of application Ser. No. 40,368, filed on May 25, 1970, now U.S. Pat. No. 3,096,101.

This invention relates to derivatives of tetrahydrobenzothiazoles and their use as herbicides. In one aspect this invention relates to the compounds of the subject invention which are characterized by the following generic formulae:

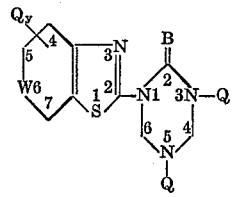

(I)

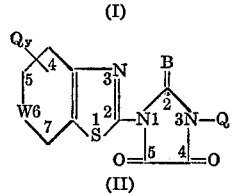

(II)

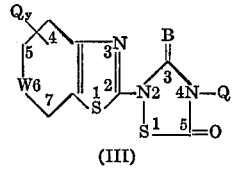

(III)

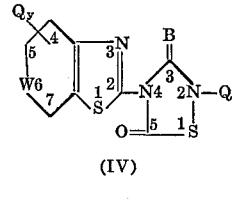

(IV)

where W can be $CHR_3$, O, or $S(O)_n$ and where $n$ can be 0, 1 or 2, or N—$R_4$. $R_3$ can be hydrogen or $C_1$–$C_6$ alkyl and $R_4$ can be $R_3$, nitro, amino, or O. Q at different positions can be different and is selected from the group consisting of hydrogen, $C_1$ to $C_{10}$ alkyl, $C_3$ to $C_{10}$ alkenyl, $C_4$ to $C_{10}$ alkynyl, $C_3$ to $C_8$ cycloalkyl, $C_1$ to $C_7$ alkoxy, $C_3$ to $C_{10}$ cycloalkoxy, $C_1$ to $C_{10}$ alkylthio, $C_1$ to $C_{10}$ alkylamino, $C_2$ to $C_{20}$ dialkylamino, $C_3$ to $C_{10}$ cycloalkylamino, $C_6$ to $C_{20}$ dicycloalkylamino. Each of the above mentioned hydrocarbon groups may be optionally substituted by halogen, hydroxy, $C_1$ to $C_4$ alkoxy, sulphonamido, $C_1$ to $C_4$ alkylthio, nitro, cyano, thiocyano or perhaloalkyl; $C_6$ or $C_{10}$ aryl, $C_6$ or $C_{10}$ aryloxy, $C_6$ or $C_{10}$ arylthio where the aforementioned groups may be optionally substituted by $C_1$ to $C_4$ alkyl, $C_1$ to $C_4$ alkoxy, $C_1$ to $C_4$ alkylthio, bishalogen, hydroxy, nitro, cyano, or carboalkoxy. Q may also be cyano, sulphonamido, $C_1$ to $C_6$ carboalkoxy, perfluoroalkyl, nitro, mercapto, $C_4$ to $C_9$ heteroaryl or $C_1$ to $C_{10}$ acyloxy optionally substituted by $C_1$ to $C_4$ alkyl, $C_1$ to $C_4$ alkoxy, $C_1$ to $C_4$ alkylthio, halogen, nitro, cyano, carboalkoxy, thiocyano or perhaloalkyl. When Q is $C_1$ to $C_{10}$ alkyl, $y$ may take values from 0 to 6. $y$ may take values from 0 to 4 for all other definitions of Q. B may be O or S.

Exemplary of such compounds which are encompassed by this invention are the following:

Compound No.:

1. 1-(2-[4,5,6,7-tetrahydrobenzothiazolyl]-2-oxo-3,5-diethylhexahydro-1,3,5-triazine
2. 1-(2-[5,5,7,7-tetramethyl-6-oxa]-4,5,6,7-tetrahydrobenzothiazolyl)-2-oxo-3,5-diethylhexahydro-1,3,5-triazine
3. 1-(2-[5,5,7,7-tetramethyl-6-thia]-4,5,6,7-tetrahydrobenzothiazolyl)-2-oxo-3-ethoxy-5-methylhexahydro-1,3,5-triazine
4. 1-(2-[5,5,7-trimethyl]-4,5,6,7-tetrahydrobenzothiazolyl)-2-oxo-3-cyano-5-N,N-dimethylaminohexahydro-1,3,5-triazine
5. 1-(2-[5,5,7,7-tetramethyl]-4,5,6,7-tetrahydrobenzothiazolyl)-2-oxo-3-carbethoxy-5-methylthiohexahydro-1,3,5-triazine
6. 1-(2-[7-(4-cyanopentyl)]-4,5,6,7-tetrahydrobenzothiazolyl)-2-oxo-3-methyl-5-hydroxymethylhexahydro-1,3,5-triazine
7. 1-(2-[5-cyclopropyl-7,7-dimethyl]-4,5,6,7-tetrahydrobenzothiazolyl)-2-oxo-3-sulphonamido-5-methylhexahydro-1,3,5-triazine
8. 1-(2-[5-cyclooctyl-7-cyano]-4,5,6,7-tetrahydrobenzothiazolyl)-2-oxo-3-methoxymethyl-5-(3-methoxypropyl)hexahydro-1,3,5-triazine
9. 1-(2-[5-(2-chlorocyclobutyl)-7,7-dimethyl]-4,5,6,7-tetrahydrobenzothiazolyl)-2-oxo-3-N,N-dimethylamino-5-methylhexahydro-1,3,5-triazine
10. 1-(2-[5,6-dimethoxy]-4,5,6,7-tetrahydrobenzothiazolyl)-2-oxo-3,5-dimethylhexahydro-1,3,5-triazine
11. 1-2(2-[5,6-diheptoxy]-4,5,6,7-tetrahydrobenzothiazolyl)-2-oxo-3,5-diphenylhexahydro-1,3,5-triazine
12. 1-(2-[5,7-dicyclobutoxy]-4,5,6,7-tetrahydrobenzothiazolyl)-2-oxo-3,5-dimethylhexahydro-1,3,5-triazine
13. 1-(2-[5,7-dicyclodecoxy]-4,5,6,7-tetrahydrobenzothiazolyl)-2-thio-3,5-dimethoxyhexahydro-1,3,5-triazine
14. 1-(2-[5,7-di(methylthio)]-4,5,6,7-tetrahydrobenzothiazolyl)-2-thio-3-cyano-5-hydroxymethylhexahydro-1,3,5-triazine
15. 1-(2-[5-decylthio-7,7-dimethyl]-4,5,6,7-tetrahydrobenzothiazolyl)-2-thio-3-dimethylaminohexahydro-1,3,5-triazine
16. 1-(2-[5-dimethylamino-6,7-dimethylthio]-4,5,6,7-tetrahydrobenzothiazolyl)-2-thio-3,5-dimethylhexahydro-1,3,5-triazine
17. 1-(2[5-didecylamino-7,7-dimethyl]-4,5,6,7-tetrahydrobenzothiazolyl)-2-thio-3,5-dimethylhexahydro-1,3,5-triazine
18. 1-(2-[5-(2,piperidinyl)-5-methyl-7,7-dimethyl]-4,5,6,7-tetrahydrobenzothiazolyl)-2-oxo-3,5-dimethoxyhexahydro-1,3,5-triazine
19. 1-(2-[5,5,7,7-tetraphenyl]-4,5,6,7-tetrahydrobenzothiazolyl)-2-oxo-3,5-dimethylhexahydro-1,3,5-triazine
20. 1-(2-[5,6-diphenoxy-7,7-dimethyl]-4,5,6,7-tetrahydrobenzothiazolyl)-2-oxo-3,5-dimethylthiohexahydro-1,3,5-triazine
21. 1-(2-[5,6-di-(p-butylphenoxy)-7-methyl]-4,5,6,7-tetrahydrobenzothiazolyl)-2-oxo-3,5-bis-chloromethylhexahydro1,3,5-triazine
22. 1-(2-[5,6-diphenylthio-7-methoxy]4,5,6,7-tetrahydrobenzothiazolyl)-2-oxo-3,5-dimethylhexahydro-1,3,5-triazine
23. 1-(2-[5,6-di-(p-butylphenylthio)-7-methyl]-4,5,6,7-tetrahydrobenzothiazolyl)-2-oxo-3,5-dimethylhexahydro-1,3,5-triazine
24. 1-(2-[5-methyl-6-phenylamino-7,7-dimethyl]-4,5,6,7-tetrahydrobenzothiazolyl)-2-oxo-3,5-dimethoxyhydro-1,3,5-triazine
25. 1-(2-[5,6-diphenylamino-7,7-dimethyl]-4,5,6,7-tetrahydrobenzothiazolyl)-2-oxo-3,5-dimethylhexahydro-1,3,5-triazine
26. 1-(2-[5,6-dicarbethoxy-7-methyl-7-trifluoromethyl]-4,5,6,7-tetrahydrobenzothiazolyl)-2-thio-3,5-dimethylthiohexahydro-1,3,5-triazine
27. 1-(2-[5-thiocyano-6-nitro-7,7-dimethyl]-4,5,6,7-tetrahydrobenzothiazolyl)-2-oxo-3,5-dimethoxyhexahydro-1,3,5-triazine
28. 1-(2-[5-methyl-5-mercapto-7,7-dimethyl]-4,5,6,7-tetrahydrobenzothiazolyl)-2-oxo-3,5-dimethylhexahydro-1,3,5-triazine
29. 1-(2-[5-sulphonamido-6-methyl-7-acetoxy]-4,5,6,7-tetrahydrobenzothiazolyl)-2-oxo-3,5-dimethylhexahydro-1,3,5-triazine
30. 1-(2-[5-(3-pyridyl)-7-methyl]-4,5,6,7-tetrahydrobenzothiazolyl)-2-oxo-3,5-dimethoxyhexahydro-1,3,5-triazine
31. 1-(2-[4,5,6,7-tetrahydrobenzothiazolyl)-3-methyl parabanic acid
32. 1-(2-[5,5,7,7-tetramethyl-6-oxa]-4,5,6,7-tetrahydrobenzothiazolyl)-3-methoxy parabanic acid
33. 1-(2-[5,5,7,7-tetramethyl-6-thia]-4,5,6,7-tetrahydrobenzothiazolyl)-3-methylthio parabanic acid
34. 1-(2-[5,5,7-trimethyl]-4,5,6,7-tetrahydrobenzothiazolyl)-3-sulphonamido parabanic acid
35. 1-(2-[5,5,7,7-tetramethyl]-4,5,6,7-tetrahydrobenzothiazolyl)-3-carbomethoxy parabanic acid
36. 1-(2-[7-(4-cyanopentyl)-4,5,6,7-tetrahydrobenzothiazolyl)-3-chloromethyl parabanic acid
37. 1-(2-[5-cyclopropyl-7,7-dimethyl]-4,5,6,7-tetrahydrobenzothiazolyl)-3-(p-hydroxyphenyl) parabanic acid
38. 1-(2-[5-cyclooctyl-7-cyano]-4,5,6,7-tetrahydrobenzothiazolyl)-3-cyano parabanic acid
39. 1-(2-[5-(2-chlorocyclobutyl)-7,7-trimethyl]-4,5,6,7-tetrahydrobenzothiazolyl)-3-N,N-dimethylamino parabanic acid
40. 1-(2-[5,6-dimethoxy]-4,5,6,7-tetrahydrobenzothiazolyl)-3-propoxy parabanic acid
41. 1-(2-[5,6-diheptoxy]-4,5,6,7-tetrahydrobenzothiazolyl)-3-propylthio parabanic acid
42. 1-(2-[5,7-dicyclobutoxy]4,5,6,7-tetrahydrobenzothiazolyl)-3-sulphonamido parabanic acid
43. 1-(2-[5,7-dicyclodecoxy]-4,5,6,7-tetrahydrobenzothiazolyl)-3-methyl parabanic acid
44. 1-2-[5,7-di(methylthio)]-4,5,6,7-tetrahydrobenzothiazolyl)-3-ethyl parabanic acid
45. 1-(2-[5-decylthio-7,7-dimethyl]-4,5,6,7-tetrahydrobenzothiazolyl)-3-carboethoxy parabanic acid
46. 1-(2-[5-dimethylamino-7,7-methylthio]-4,5,6,7-tetrahydrobenzothiazolyl)-3-(p-tolyl) parabanic acid
47. 1-(2-[5,6-didecylamino-7,7-dimethyl]4,5,6,7-tetrahydrobenzothiazolyl)-3-N,N-diphenylamino parabanic acid 48  1-(2-[5-(2-piperidinyl)-5-methyl-7,7-dimethyl]-4,5,6,7-tetrahydrobenzothiazolyl)-3-nitro parabanic acid
49  1-(2-[5,5,7,7-tetraphenyl]-4,5,6,7-tetrahydrobenzothiazolyl)-3-propoxy parabanic acid
50  1-(2-[5,6-diphenoxy-7,7-dimethyl]-4,5,6,7-tetrahydrobenzothiazolyl)-3-ethoxy parabanic acid
51  1-(2-[5,6-di-(p-butylphenoxy)-7-methyl]-4,5,6,7-tetrahydrobenzothiazolyl)-3-ethyl parabanic acid
52  1-(2-[5,6-diphenylthio-7-methoxy]-4,5,6,7-tetrahydrobenzothiazolyl)-3-thioethyl parabanic acid
53  1-(2-[5,6-di-(p-butylphenylthio)-7-methyl]-4,5,6,7-tetrahydrobenzothiazolyl)-3-carbopropoxy parabanic acid
54  1-(2-[5-methyl-6-phenylamino-7,7-dimethyl]-4,5,6,7-tetrahydrobenzothiazolyl)-3-acetoxy parabanic acid
55  1-(2-[5,6-diphenylamino-7,7-dimethyl]-4,5,6,7-tetrahydrobenzothiazolyl)-3-cyano parabanic acid
56  1-(2-[5,6-dicarbethoxy-7-methyl-7-trifluoromethyl]-4,5,6,7-tetrahydrobenzothiazolyl)-3-hydroxymethyl parabanic acid
57  1-(2-[5-thiocyano-6-nitro-7,7-dimethyl]-4,5,6,7-tetrahydrobenzothiazolyl)-3-methylamino parabanic acid
58  1-(2-[5-ethyl-6-mercapto-7,7-dimethyl]-4,5,6,7-tetrahydrobenzothiazolyl)-3-chloromethyl parabanic acid
59  1-(2-[5-sulphonamido-6-methyl-7-acetoxy]-4,5,6,7-tetrahydrobenzothiazolyl)-3-phenyl parabonic acid
60  1-(2-[5-(3-pyridyl)-5-methyl]-4,5,6,7-tetrahydrobenzothiazolyl)-3-(4-chlorophenyl) parabanic acid
61  2-(2-[4,5,6,7-tetrahydrabenzothiazolyl])-3,5-dioxo-4-methyl-1,2,4-thiaimidazolidine
62  2-(2-[5,5,7,7-tetramethyl-6-oxa]-4,5,6,7-tetrahydrobenzothiazolyl)-3,5-dioxo-4-methoxy-1,2,4-thiaimidazolidine
63  2-(2-[5,5,7,7-tetramethyl-6-thia]-4,5,6,7-tetrahydrobenzothiazolyl)-3,5-dioxo-4-methylthio-1,2,4-thiaimidazolidine
64  2-(2-[5,5,7-trimethyl]-4,5,6,7-tetrahydrobenzothiazolyl)-3,5-dioxo-4-sulphonamido-1,2,4-thiaimidazolidine
65  2-(2-[5,5,7,7-tetramethyl]-4,5,6,7-tetrahydrobenzothiazolyl)-3,5-dioxo-4-carbomethoxy-1,2,4-thiaimidazolidine
66  2-(2-[7-(4-cyanopentyl)]-4,5,6,7-tetrahydrobenzothiazolyl)-3,5-dioxo-4-chloromethyl-1,2,4-thiaimidazolidine
67  2-(2-[5-cyclopropyl-7,7-dimethyl]-4,5,6,7-tetrahydrobenzothiazolyl)-3,5-dioxo-4-(p-hydroxyphenyl)-1,2,4-thiaimidazolidine
68  2-(2-[5-cyclooctyl-7-cyano]-4,5,6,7-tetrahydrobenzothiazolyl)-3,5-dioxo-4-cyano-1,2,4-thiaimidazolidine
69  2-(2-[5-(2-chlorocyclobutyl)-7,7-trimethyl]-4,5,6,7-tetrahydrobenzothiazolyl)-3,5-dioxo-4-N,N-dimethylamino-1,2,4-thiaimidazolidine
70  2-(2-[5,6-dimethoxy]-4,5,6,7-tetrahydrobenzothiazolyl)-3,5-dioyo-4-propoxy-1,2,4-thiaimidazolidine
71  2-(2-[5,6-diheptoxy]-4,5,6,7-tetrahydrobenzothiazolyl)-3,5-dioxo-4-propylthio-1,2,4-thiaimidazolidine
72  2-(2-[5,7-dicyclobutoxy]-4,5,6,7-tetrahydrobenzothiazolyl)-3,5-dioxo-4-sulphonamido-1,2,4-thiaimidazolidine
73  2-(2-[5,7-dicyclodecoxy]-4,5,6,7-tetrahydrobenzothiazolyl)-3,5-dioxo-4-methyl-1,2,4-thiamidazolidine
74  2-(2-[5,7-dimethylthio]-4,5,6,7-tetrahydrobenzothiazolyl)-3,5-dioxo-4-ethyl-1,2,4-thiaimidazolidine
75  2-(2-[5-decylthio-7,7-dimethyl]-4,5,6,7-tetrahydrobenzothiazolyl)-3,5-dioxo-4-carboethoxy-1,2,4-thiaimidazolidine
76  2-(2-[5-dimethylamino]-6,7-dimethylthio-4,5,6,7-tetrahydrobenzothiazolyl)-3,5-dioxo-4-(p-toyl)-1,2,4-thiaimidazolidine
77  2-(2-[5,6-dibutylamino]-7,7-dimethyl-4,5,6,7-tetrahydrobenzothiazolyl)-3,5-dioxo-4-N,N-diphenylamino-1,2,4-thiaimidazolidine
78  2-(2-[5,5,7,7-tetraphenyl]-4,5,6,7-tetrahydrobenzothiazolyl)-3,5-dioxo-4-nitro-1,2,4-thiaimidazolidine
79  2-(2-[5,57,7-tetraphenyl]-4,5,6,7-tetrahydrobenzothiazolyl)-3,5-dioxo-4-propoxy-1,2,4-thiaimidazolidine
80  2-(2-[5,6-diphenoxy-7,7-dimethyl]-4,5,6,7-tetrahydrobenzothiazolyl)-3,5-dioxo-4-ethoxy-1,24-thiaimidazolidine
81  2-(2-[5,6-di-(p-butylphenoxy)-7-methyl]-4,5,6,7-tetrahydrobenzothiazolyl)-3,5-dioxo-4-ethyl-1,2,4-thiaimidazolidine
82  2-(2-[5-phenylthio-7-phenoxy]-4,5,6,7-tetrahydrobenzothiazolyl)-3,5-dioxo-4-ethylthio-1,2,4-thiaimidazolidine
83  2-(2-[5-(p-butylphenthio)-7-methyl]-4,5,6,7-tetrahydrobenzothiazolyl)-3,5-dioxo-4-carbopropoxy-1,2,4-thiaimidazolidine
84  4-(2-[5-methyl-5-phenylamino-7,7-dimethyl]-4,5,6,7-tetrahydrobenzothiazolyl)-3,5-dioxo-2-actoxy-1,2,4-thiaimidazolidine
85  2-(2-[5,6-diphenylamino-7,7-dimethyl]-4,5,6,7-tetrahydrobenzothiazolyl)-3,5-dioxo-4-cyano-1,2,4-thiaimidazolidine
86  4-(2-[5,7-dicarbethoxy-7-trifluoromethyl]-4,5,6,7-tetrahydrobenzothiazolyl)-3,5-dioxo-2-hydroxymethyl-1,2,4-thiaimidazolidine
87  2-(2-[5-thiocyano-6-nitro-7,7-dimethyl]-4,5,6,7-tetarhydrobenzothiazolyl)-3,5-dioxo-4-methylamino-1,2,4-thiaimidazolidine
88  2-(2-[5-ethyl-6-mercapto-7,7-dimethyl]-4,5,6,7-tetrahydrobenzothiazolyl)-3,5-dioxo-4-chloromethyl-1,2,4-thiaimidazolidine
89  4-(2-[5-sulphonamido-5-methyl-7-acetoxy]-4,5,6,7-tetrahydrobenzothiazolyl)-3,5-dioxo-2-phenyl-1,2,4-thiaimidazolidine
90  4-(2-[5-(3-pyridyl)-6-methyl]-4,5,6,7-tetrahydrobenzothiazolyl)-3,5-dioxo-2-(4-chlorophenyl)-1,2,4-thiaimidazolidine The foregoing compounds can be readily prepared by the following methods.

The preparation of the 2-aminotetrahydrobenzothiazoles which act as one of the starting materials in the method for the preparation of the above-identified compounds is described in a copending application bearing Ser. No. 832,809, filed June 12, 1969, in the name of John E. Englehart, now U.S. Pat. No. 3,682,945.

The preparation of N-methylurea derivatives, another precursor in the formation of the compounds of the subject invention, involves reaction of the aforesaid 2-aminotetrahydrobenzothiazole with an appropriately substituted isocyanate. The isocyanate is reacted with the above mentioned amine which has been dissolved in a solvent such as benzene, acetone, carbon tetrachloride or the like. In this reaction benzene is the preferred solvent and the reaction is carried out at a temperature ranging from 40° to 80° C., with the preferred range being from 65 to 75° C.

The synthesis of the triazines (I) can be schematically represented as follows:

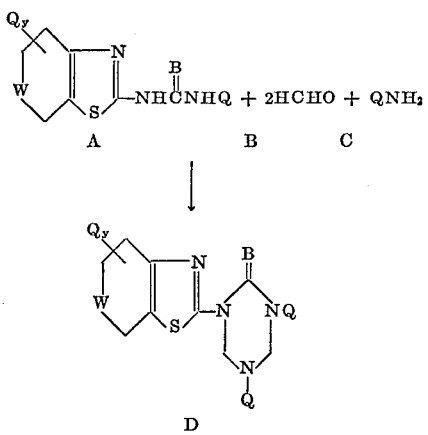

In this reaction, the mole ratio of reactants A:B:C is 1:2:1. The reaction is carried out in the presence of a highly polar solvent, said solvent being one selected from the group consisting of dioxane, water or dimethyl formamide. Dimethylformamide is preferred. Details of this synthesis are described in Belgian Pat. 662,235, issued in 1965 to Farbenfabriken Bayer Aktiengesellschaft.

The preparation of substituted parabanic acid derivatives (II) follows closely the process outlined in the Netherlands Pat. 6502126, issued in 1965, to Farbenfabriken Bayer Aktiengesellschaft or a Du Pont U.S. Pat. No. 2,895,817, issued in 1959. This reaction can be represented schematically as follows:

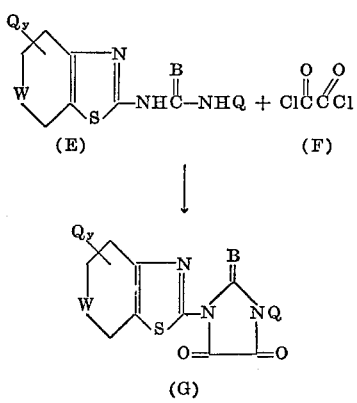

In this reaction, reactant E is mixed with reactant F in equimolar ratios in a solvent such as chlorobenzene. The reaction takes place at a temperature ranging from 20 to 150° C., preferably from 95 to 110° C., and the reaction can be carried out at ambient pressures.

The thiaimidazolidines (III and IV) can be prepared according to the procedure outlined in a South African Pat. 677,491 issued to Farbenfabriken Bayer Aktiengesellschaft according to the following equation:

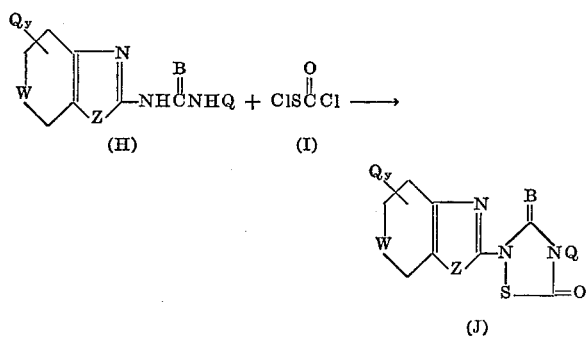

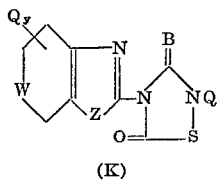

Reactant H can be mixed with reactant I in equimolar amounts in an anhydrous hydrocarbon solvent such as benzene, hexane, toluene; chlorinated hydrocarbons such as carbon tetrachloride; ethers such as dioxane, or esters such as ethyl acetate.

After the two reactants are mixed the mixture can be heated to a temperature ranging from 20 to 150° C., preferably from 50 to 80° C.

The compounds of the invention have general herbicidal properties. They are especially useful in certain types of weed control such as, for example, in application to crop lands to give control of the common weeds, without harming the crop plants; and for the control of crabgrass in lawns.

Herbicidal compositions of the invention are prepared by admixing one or more of the active ingredients defined heretofore, in herbicidally effective amounts with a conditioning agent of the kind used and referred to in the art as a pest control adjuvant or modifier to provide formulations adapted for ready and efficient application to soil or weeds (i.e., unwanted plants) using conventional applicator equipment.

Thus, the herbicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cyclic ketones, relatively high up to about 50% by weight or more concentration of the active ingredient can be obtained in solution.

The herbicidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal compositions are applied either as a spray, granular or a dust to the locus or area to be protected from undesirable plant growth, commonly called weeds, i.e. plants growing where they are not wanted. Such application can be made directly upon the locus or area and the weeds thereon during the period of weed infestation in order to destroy the weeds, or alternatively, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal compositions of the invention for selective weed control as in the control of weeds in cotton or corn fields, the compositions are preferably applied after emergence of the seedlings. In other words, the applications are of the post-emergence type although pre-emergence applications may also be effective.

The active compound is, of course, applied in an amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray, dust or granular, will contain from about 0.1% to 100% by weight of the active compound.

Fertilizer materials, other herbicidal agents, and other pest control agents such as insecticides and fungicides can be included in the herbicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals although subsequently subjected to grinding, sieving, purification and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium lines, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present invention.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct

11 from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene and propylene oxide, as for example, the condensation product of oleic acid and ethylene oxide containing about 6 to 15 ethylene oxide units in the molecule. Other nonionic wetting agents like polyalkylene oxide polymers, commerically known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be uesd, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc., by which the compounds and/or compositions described and claimed are prepared and/or used.

EXAMPLE 1

Preparation of the triazinones

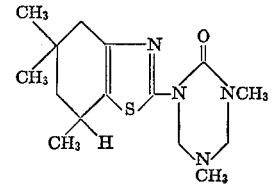

To a suspension of 18.50 g. (0.0736 mol) of N-methyl-N'-[5,5,7-trimethyl]-4,5,6,7-tetrahydro benzothiazolyl) urea in 100 ml. of dimethylformamide was added dropwise 11.90 g. (0.15 mol) of a 37% aqueous solution of formaldehyde. After the addition the mixture was stirred ½ hour. 5.71 g. (0.074 mol) of a 40% aqueous solution of methylamine was added dropwise. The mixture was heated to 100° at which point all the solid dissolved. After 2 hours the solution was cooled to room temperature resulting in precipitation of a white solid. The product was removed by filtration, washed with ethyl acetate, dried in vacuo at 100° C. and recrystallization from ethyl acetate.

Yield: 18 g., M.P. 162–164° C.
Theory: C=58.50%; H=7.80%; N=18.20%
Found: C=58.20; H=7.80%; N=18.20%

NMR and IIR analysis also confirmed structure.

All of the compounds enumerated hereinbelow in Table I were made according to the above-described procedure.

TABLE I

| Ex. | Name of compound | Structure elucidation |
|---|---|---|
| 1 | 1-(2-[5,5,7-trimethyl]-4,5,6,7-tetrahydrobenzothiazolyl)-2-oxo-3,5-dimethyl hexahydro-1,3,5-triazine. | IR, NMR, elemental analysis. |
| 2 | 1-(2-[5,5,7,7-tetramethyl]-4,5,6,7-tetrahydro benzothiazolyl)-2-oxo-3,5-idmethyl hexahydro-1,3,5-triazine. | Do. |
| 3 | 1-(2-[5,5,7,7-tetramethyl-6-thia]-4,5,6,7-tetrahydro benzothiazolyl)-2-oxo-3,5-dimethyl hexahydro-1,3,5-triazine. | Do. |
| 4 | 1-(2-[5,5,7,7-tetramethyl-6-oxo]-4,5,7,7-tetrahydro benzothiazolyl)-2-oxo-3,5-dimethyl hexanhydro-1,3,5-triazine. | Do. |
| 5 | 1-(2-[5,5,7-trimethyl-7-cyanol]-4,5,6,7-tetrahydro benzothiazolyl)-2-oxo-3,5-dimethyl hexahydro-1,3,5-trizaine. | Do. |
| 6 | 1-(2-[5,5,7-trimethyl-7-cyanol]-4,5,6,7-tetrahydro benzothiazolyl)-2-oxo-3-methyl-5-(3-methoxypropyl) hexahydro-1,3,5-trizaine. | Do. |
| 7 | 1-(2-[5,5,7-trimethyl-7-cyanol]-4-5,5,7-tetrahydro benzothiazolyl)-2-oxo-3-methyl-5-(2-methoxy ethyl) hexahydro-1,3,5-triazine. | Do. |
| 8 | 1-(2-[5,5,7,7-tetarmethyl]-4,5,6,7-tetrahydro benzothiazolyl)-2-oxo-3-methyl-5-tetrahydrofurfuryl hexahydro-1,3,5-triazine. | Do. |
| 9 | 1-(2-[5,5,7-trimethyl-7-cyano]-4-5,6,7-tetrahydro benzothiazolyl)-2-oxo-3-methyl-5-tetrahydrofurfuryl hexahydro-1,3,5-triazine. | Do. |
| 10 | 1-(2-[5,5,7-trimethyl-7-cyanol]-4,5,6,7-tetrahydro benzothiazolyl)-2-oxo-3- methyl-5- methoxy hexahydro-1,3,5-triazine. | Do. |
| 11 | 1-(2-[5,5,7-trimethyl-7-cyanol-4,5,6,7-tetrahydro benzothiazolyl)-2-oxo-3-methyl-5-N,N-dimethylamino hexahydro-1,3,5-triazine. | Do. |
| 12 | 1-(2-[5,5,7,7,tetramethyl-4,5,6,7-tetrahydro benzothiazolyl)-2-oxo-4-methyl-5-(3-methoxypropyl) hexahydro-1,3,5-triazine. | Do. |
| 13 | 1-(2-[5,5,7,7-tetarmethyl-4,5,6,7-tetrahydro benzothiazolyl)-2-oxo-3-methyl-5-(2-methoxy ethyl) hexahydro-1,3,5-triazine. | Do. |
| 14 | 1-(2-[5,5,7-trimethyl-7-cyanol[-4,5,6,7-tetrahydro benzothiazolyl)-2-oxo-3- methyl-5-(3-pyridyl) hexhydro-1,3,5-triazine. | Do. |

EXAMPLE 2

Preparation of parabanic acid derivatives

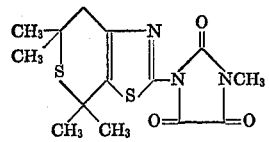

To a solution of 1.39 g. (0.011 m.) oxalyl chloride in 30 ml. anhydrous chlorobenzene heated to 50° C. was added 3 g. (0.0105 mol) of N-methyl-N'-(2-[5,5,7,7-tetramethyl-6-thia]-4,5,6,7-tetrahydro benzothiazolyl) urea portionwise over a 15 minute period. After the addition the solution was heated to 100° C. for 2 hours then 80° C. for an additional 3 hour period. The solution was cooled to room temperature and enough pet. ether (30–60°C.) added to bring the solution to the cloud point. Three grams of a light yellow solid which precipitated was dried in vacuo at 100° C., M.P. 164–165° C.

Theory: C=49.60%; H=5.03%; N=12.40%
Found: C=49.96%; H=5.21%; N=13.14%

NMR and IR confirmed structure.

The following members of this class were prepared according to the procedure outlined hereinabove.

TABLE II

| Ex. | Name of compound | Structure elucidation |
|---|---|---|
| 15 | 1-(2-[5,5,7-trimethyl]-4,5,6,7-tetrahydro benzothiazolyl)-3-methyl parabanic acid. | IR, NMR, elemental analysis. |
| 16 | 1-(2-[5,5,7,7-tetramethyl-4,5,6,7-tetrahydro benzothiazolyl)-3-methyl parabanic acid. | Do. |
| 17 | 1-(2-[5,5,7,7-tetramethyl-6-oxa]-4,5,6,7-tetrahydro benzothiazolyl)-3-methyl parabanic acid. | Do. |
| 18 | 1-(2-[5,5,7-trimethyl-7-cyano]-4,5,6,7-tetrahydro benzothiazolyl-3-methyl parabanic acid. | Do. |

EXAMPLE 3

Preparation of thiaimidazolidines

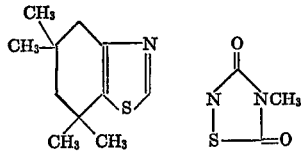

Chlorocarbonylsulfenyl chloride, 9.04 g. (0.069 mol) was added dropwise to a mixture of 17.56 g. (0.063 mol) of N-methyl-N'-(2-[5,5,7,7-tetramethyl-4,5,6,7-tetrahydro benzothiazolyl) urea in 100 ml. anhydrous benzene. The mixture was heated to reflux for 7 hours. The solution was cooled to room temperature and the solvent removed in vacuo to yield 15.30 g. (73%) of crude product. Recrystallization from benzene-methanol gave pure material.

Yield: 72%, M.P. 184–186° C.

Theory: C=50.00%; H=4.77%; N=16.68%
Found: C=50.20%; H=4.67%; N=16.37%

NMR and IR confirmed structure.

The following compounds were prepared according to the procedure outlined hereinabove.

TABLE III

| Ex. | Name of compound | Structure elucidation |
|---|---|---|
| 19 | 2-(2-[5,5,7,7-tetramethyl]-4,5,6,7-tetrahydro benzothiazolyl)-3,5-dioxo-4-methyl-1,2,4-thiaimidazolidine. | IR, NMR, elemental analysis. |
| 20 | 2-(2-[5,5,7,7-tetramethyl-6-thia]-4,5,6,7-tetrahydro benzothiazolyl)-3,5-dioxo-4-methyl-1,2,4-thiaimidazolidine. | Do. |
| 21 | 2-(2-[5,5,7,7-tetramethyl-6-oxa]-4,5,6,7-tetrahydro benzothiazolyl)-3,5-dioxo-4-methyl-1,2,4-thiaimidazolidine. | Do. |

EXAMPLE 4

Test for herbicidal utility of these compounds

Representative compounds from those prepared in the previous examples were evaluated for pre-emergence herbicidal activity. The test procedure employed was as follows:

Two flats seeded with six crops (cotton, soybean, alfalfa, corn, rice and oats) and six weeds (mustard, morning-glory, crabgrass, foxtail, barnyard grass and zinnia) were sprayed with a formulation containing the test chemical at the rate given in Tables IV and V. The test chemicals were sprayed as acetone solutions or acetone suspensions of very small particle size onto the test plants. Sprayers were calibrated to deliver a certain volume of liquid and the calculated amount of active ingredient which would give a rate corresponding to the indicated pounds/acre. The flats were then held in the greenhouse and a response rated after 12 days to 16 days. Response was rated by a scale of 0–10. The 0–10 scale is defined as: 0=no injury; 1–3=slight injury; 4–6=moderate injury; plants may die; 7–9=severe injury, plants will probably die; 10=all plants dead (complete kill). The results of this test as shown below are indicative that many of these compounds show a high degree of herbicidal activity in many weed species, but may remain highly tolerant of desirable crop species.

TABLE IV.—PRE-EMERGENCE HERBICIDAL ACTIVITY

| Name of compound | Conc. (lb./a.) | Barn | Crab | Fox. | Zinn. | Must. | Mngy. | Cot. | Soy. | Alf. | Corn | Rice | Oats |
|---|---|---|---|---|---|---|---|---|---|---|---|---|---|
| 1-(2-[5,5,7,7-tetramethyl-7-cyano]-4,5,6,7-tetrahydrobenzothiozolyl)-2-oxo-3,5-dimethyl hexahydro-1,3,5-triazine | 10 | 6 | 8 | 9 | 9 | 10 | 10 | 2 | 0 | 8 | 0 | 0 | 0 |
| 1-(2-[5,5,7-trimethyl-7-cyano]-4,5,6,7-tetrahydro benzothiazolyl)-3-methyl parabanic acid | 10 | 3 | 7 | 9 | 8 | 9 | 6 | 2 | 0 | 8 | 0 | 0 | 0 |

Representative derivatives of the various compounds of this invention were evaluated for post-emergence activity. The test procedure was as follows:

Flats were seeded, as described in the previous example and held until the first two leaves had appeared on all plants which were then sprayed in the same fashion as in the preceding example at a rate of 10 lbs. per acre. The plant responses were rated 12 to 16 days after treatment on the same scale as described previously. The test results are shown in the tables which follow.

2. A compound according to claim 1 which is, 2-(2-[5,5,7-trimethyl-7-cyano] - 4,5,6,7 - tetrahydrobenzothiazolyl)-3,5-dioxo-4-methyl-1,2,4-thiadiazolidine.

3. A compound according to claim 1, which is 2-(2-[5,5,7,7-tetramethyl]-4,5,6,7 - tetrahydrobenzothiazolyl)-3,5-dioxo-4-methyl-1,2,4-thiadiazolidine.

4. A compound according to claim 1, which is 2-(2-[5,5,7,7-tetramethyl - 6 -thia] - 4,5,6,7-tetrahydrobenzothiazolyl)-3,5-dioxo-4-methyl-1,2,4-thiadiazolidine.

5. A compound according to claim 1, which is 2-(2-[5,5,7,7-tetramethyl - 6 - oxa] - 4,5,6,7-tetrahydrobenzothiazolyl)-3,5-dioxo-4-methyl-1,2,4-thiadiazolidine.

TABLE V.—POST-EMERGENCE HERBICIDAL ACTIVITY OF TRIAZINONES

| Name of compound | Conc. (lb./a.) | Barn. | Crab. | Fox. | Zinn. | Must. | Mngy. | Cot. | Soy. | Alf. | Corn | Rice | Oats |
|---|---|---|---|---|---|---|---|---|---|---|---|---|---|
| 1-(2-[5,5,7-trimethyl]-4,5,6,7-tetrahydrobenzothiazolyl)-2-oxo-3,5-dimethyl hexahydro-1,3,5-triazine | 10 | 10 | 10 | 10 | 10 | 10 | 10 | 10 | 6 | 8 | 10 | 8 | 4 | 4 |
| 1-(2-[5,5,7,7-tetramethyl-6-oxa]-4,5,6,7-tetrahydrobenzothiazolyl)-2-oxo-3-dimethyl hexahydro-1,3,5-triazine | 10 | 10 | 10 | 10 | 10 | 10 | 10 | 10 | 10 | 10 | 10 | 9 | 8 | 8 |
| 1-(2-[5,5,7-trimethyl-7-cyano]-4,5,6,7-tetrahydro benzothiazolyl)-2-oxo-3,5-dimethyl hexahydro-1,3,5-triazine | 10 | 10 | 10 | 10 | 10 | 10 | 10 | 10 | 10 | 10 | 8 | 5 | 7 | 9 |
| 1-(2-[5,5,7-trimethyl-7-cyano]-4,5,6,7-tetrahydrobenzothiazolyl)-2-oxo-3-methyl-5-(3-methoxypropyl)hexahydro-1,3,5-triazine | 10 | 10 | 10 | 10 | 10 | 10 | 10 | 10 | | | | | | |
| 1-(2-[5,5,7-trimethyl-7-cyano]-4,5,6,7-tetrahydro benzothiazolyl)-2-oxo-3-methyl-5-(2-methoxy ethyl)hexahydro-1,3,5-triazine | 10 / 2.5 | 10 / 10 | 10 / 9 | 10 / 10 | 10 / 10 | 10 / 10 | 10 / 10 | 10 / 10 | 10 / 7 | 9 / 9 | 10 / 10 | 4 / 2 | 9 / 9 | 8 / 4 |
| 1-(2-[5,5,7,7-tetramethyl]-4,5,6,7-tetrahydro benzothiazolyl)-2-oxo-3-methyl-5-tetrahydrofurfuryl hexahydro-1,3,5-triazine | 10 / 2.5 | 10 / 9 | 10 / 10 | 10 / 10 | 10 / 10 | 10 / 10 | 10 / 10 | 1 / 1 | 10 / 9 | 10 / 2 | 10 / 9 | 9 / 9 | 8 / 4 |

TABLE VI.—POST-EMERGENCE HERBICIDAL ACTIVITY OF PARABANIC ACID DERIVATIVES

| Name of compound | Conc. (lb./a.) | Barn | Crab | Fox. | Zinn. | Must. | Mngy. | Cot. | Soy. | Alf. | Corn | Rice | Oats |
|---|---|---|---|---|---|---|---|---|---|---|---|---|---|
| 1-(2-[5,5,7,7-tetramethyl-6-thia]-4,5,6,7-tetrahydro benzothiazolyl-3-methyl parabanic acid | 10 / 2.5 | 10 / 9 | 10 / 9 | 10 / 10 | 10 / 10 | 10 / 10 | 10 / 10 | 10 / 4 | 9 / 8 | 10 / 9 | 0 / 0 | 2 / 1 | 2 / 1 |
| 1-(2-[5,5,7-trimethyl]-4,5,6,7-tetrahydro benzothiazolyl)-3-methyl parabanic acid | 10 | 8 | 9 | 10 | 10 | 10 | 10 | 8 | 10 | 10 | 5 | 6 | 5 |
| 1-(2-[5,5,7,7-tetramethyl]-4,5,6,7-tetrahydro benzothiazolyl)-3-methyl parabanic acid | 10 | 9 | 9 | 10 | 10 | 10 | 10 | | | | | | |
| 1-(2-[5,5,7,7-tetramethyl-6-oxa]-4,5,6,7-tetrahydro benzothiazolyl)-3-methyl parabanic acid | 10 | 6 | 8 | 8 | 10 | 10 | 10 | 10 | 10 | 10 | 8 | 8 | 8 |
| 1-(2-[5,5,7-trimethyl-7-cyano]-4,5,6,7-tetrahydro benzothiazolyl)3-methyl parabanic acid | 10 | 10 | 10 | 10 | 10 | 10 | 10 | 10 | 10 | 10 | 9 | 9 | 9 |

TABLE VII.—POST-EMERGENCE HERBICIDAL ACTIVITY OF THIAIMIDAZOLIDINES

| Name of compound | Conc. (lb./a.) | Barn | Crab | Fox. | Zinn. | Must. | Mngy. | Cot. | Soy. | Alf. | Corn | Rice | Oats |
|---|---|---|---|---|---|---|---|---|---|---|---|---|---|
| 2-(2-[5,5,7-trimethyl-7-cyano]-4,5,6,7-tetrahydro benzothiazolyl)-3,5-dioxo-4-methyl-1,2,4-thiaimidazolidine | 10 | 9 | 10 | 10 | 10 | 10 | 10 | | | | | | |
| 2-(2-[5,5,7,7-tetramethyl]-4,5,6,7-tetrahydro benzothiazolyl)-3,5-dioxo-4-methyl-1,2,4-thiaimidazolidine | 10 | 10 | 10 | 10 | 10 | 10 | 10 | 10 | 10 | 10 | 10 | 6 | 10 |
| 2-(2-[5,5,7,7-tetramethyl-6-thia]-4,5,6,7-tetrahydro benzothiazolyl)-3,5-dioxo-4-methyl-1,2,4-thiaimidazolidine | 10 | 8 | 8 | 10 | 10 | 10 | 10 | 1 | 5 | 10 | | 1 | 1 |
| 2-(2-[5,5,7,7-tetramethyl-6-oxa]-4,5,6,7-tetrahydro benzothiazolyl)-3,5-dioxo-4-methyl-1,2,4-thiaimidazolidine | 10 | 10 | 10 | 10 | 10 | 10 | 10 | 8 | 10 | 10 | 8 | 9 | 8 |

What is claimed is:

1. A compound of the formula

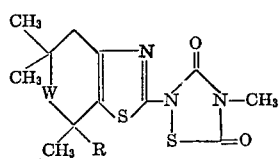

wherein R is methyl or cyano and W is —CH$_2$—, —S— or —O—.

References Cited
UNITED STATES PATENTS 3,682,945 8/1972 Engelhart ———— 260—306.8 F
3,696,101 10/1972 Litt et al. ———— 260—248 NS RICHARD J. GALLAGHER, Primary Examiner